United States Patent
Ishii et al.

(10) Patent No.: US 11,705,776 B2
(45) Date of Patent: Jul. 18, 2023

(54) ROTATING ELECTRIC MACHINE UNIT

(71) Applicant: Honda Motor Co., Ltd., Tokyo (JP)

(72) Inventors: Dai Ishii, Tokyo (JP); Takahiro Uneme, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 79 days.

(21) Appl. No.: 17/522,877

(22) Filed: Nov. 9, 2021

(65) Prior Publication Data

US 2022/0190676 A1 Jun. 16, 2022

(30) Foreign Application Priority Data

Dec. 14, 2020 (JP) ................................. 2020-206964

(51) Int. Cl.
*H02K 5/22* (2006.01)

(52) U.S. Cl.
CPC .................................... *H02K 5/225* (2013.01)

(58) Field of Classification Search
CPC ................... H02K 5/225; H01L 21/50; H01L 2224/48091; H01L 2924/00014
See application file for complete search history.

(56) References Cited

U.S. PATENT DOCUMENTS

| 2010/0321889 A1* | 12/2010 | Yoshino | ............ H05K 7/20927 |
| | | | 361/702 |
| 2018/0170188 A1* | 6/2018 | Uneme | ................... B60L 53/22 |
| 2022/0190676 A1* | 6/2022 | Ishii | ....................... H02K 5/225 |

FOREIGN PATENT DOCUMENTS

| JP | 2004082940 A | * | 3/2004 |
| JP | 5692003 | | 4/2015 |

OTHER PUBLICATIONS

JP-2004082940-A, Habara, All pages (Year: 2004).*

* cited by examiner

*Primary Examiner* — Naishadh N Desai
(74) *Attorney, Agent, or Firm* — JCIPRNET

(57) ABSTRACT

A rotating electric machine unit including a connector holding six connecting terminals is provided. When viewed from an axial direction, respective one-end parts of first to third connecting terminals are arranged side by side in a row. When viewed from the axial direction, respective one-end parts of fourth and fifth connecting terminals are arranged to offset to a back side of a first row composed of the first to third connecting terminals, and the one-end parts protrude further inside a casing than the one-end parts of the connecting terminals of the first row. When viewed from the axial direction, a one-end part of a sixth connecting terminal is arranged to offset to a back side of a second row composed of the fourth and fifth connecting terminals, and the one-end part protrudes further inside the casing than the one-end parts of the connecting terminals of the second row.

3 Claims, 8 Drawing Sheets

ROTATING ELECTRIC MACHINE UNIT

CROSS-REFERENCE TO RELATED APPLICATION

This application claims the priority benefit of Japan application serial no. 2020-206964, filed on Dec. 14, 2020. The entirety of the above-mentioned patent application is hereby incorporated by reference herein and made a part of this specification.

BACKGROUND

Technical Field

The disclosure relates to a rotating electric machine unit mounted on a vehicle.

Description of Related Art

In many hybrid vehicles and electric vehicles, a power drive unit (PDU) is attached to an upper part of a rotating electric machine unit that houses a motor and a generator (i.e., two rotating electric machines) for driving. The power drive unit converts the DC power of a battery into a high-voltage AC power suitable for driving of the motor, and converts the AC power generated by the motor or the generator into a DC power and lowers the voltage to a predetermined voltage to charge the battery. Energizing parts of three phases of the motor (i.e., one of the rotating electric machines) are connected to corresponding conductive passages in the power drive unit via a connector having three connecting terminals. Further, energizing parts of three phases of the generator (i.e., the other of the rotating electric machines) are similarly connected to corresponding conductive passages in the power drive unit via another connector having three connecting terminals.

However, in the case of a structure in which the two rotating electric machines are respectively connected to the conductive passages on the power drive unit side via separate connectors, two types of connectors are required, which is likely to cause a rise in product costs due to an increase in the number of components.

As a rotating electric machine unit that can address this situation, it has been devised that the three connecting terminals connected to the one rotating electric machine and the three connecting terminals connected to the other rotating electric machine are arranged side by side in a row and held by one connector (see, for example, Patent Document 1: Japanese Patent No. 5692003).

However, since the rotating electric machine unit described in Patent Document 1 uses a connector that holds six connecting terminals side by side in a row, for example, when the connector is arranged above the one rotating electric machine which is large in a manner that a one-end part of each of the connecting terminals is oriented downward (oriented toward a direction substantially orthogonal to an axial direction of the rotating electric machine), in order to prevent the connector from interfering with the rotating electric machine, the arrangement position of the connector cannot be lowered beyond a certain level. Therefore, the outer shape of the rotating electric machine unit becomes large.

SUMMARY

A rotating electric machine unit according to the disclosure adopts the following configuration. Namely, the rotating electric machine unit according to an embodiment of the disclosure includes two rotating electric machines (e.g., a motor 14 and a generator 15 of the embodiment) having energizing parts of three phases; a casing (e.g., a casing 13 of the embodiment) that houses therein the two rotating electric machines; three connecting terminals (e.g., a first connecting terminal 19a, a second connecting terminal 19b, and a third connecting terminal 19c of the embodiment) that connect the energizing parts of the three phases of one of the rotating electric machines to corresponding conductive passages of a power drive unit (e.g., a power drive unit 16 of the embodiment); three other connecting terminals (e.g., a fourth connecting terminal 19d, a fifth connecting terminal 19e, and a sixth connecting terminal 19f of the embodiment) that connect the energizing parts of the three phases of the other of the rotating electric machines to corresponding conductive passages of the power drive unit; and a connector (e.g., a connector 17 of the embodiment) that holds the six connecting terminals so that one-end parts in a longitudinal direction are oriented toward a same direction. The connector is attached to the casing in a manner that the one-end parts of the six connecting terminals are oriented toward a direction substantially orthogonal to an axial direction of the one of the rotating electric machines. When viewed from the axial direction, the respective one-end parts of a first connecting terminal (e.g., a first connecting terminal 19a of the embodiment), a second connecting terminal (e.g., a second connecting terminal 19b of the embodiment), and a third connecting terminal (e.g., a third connecting terminal 19c of the embodiment), which are three connecting terminals of the six connecting terminals, are arranged side by side in a row. When viewed from the axial direction, the respective one-end parts of a fourth connecting terminal (e.g., a fourth connecting terminal 19d of the embodiment) and a fifth connecting terminal (e.g., a fifth connecting terminal 19e of the embodiment), which are two remaining connecting terminals of the six connecting terminals, are arranged to offset to a back side of a first row (e.g., a first row R1 of the embodiment) composed of the first connecting terminal, the second connecting terminal, and the third connecting terminal, and the one-end parts protrude further inside the casing than the one-end parts of the connecting terminals of the first row. When viewed from the axial direction, the one-end part of a sixth connecting terminal (e.g., a sixth connecting terminal 19f of the embodiment), which is one remaining connecting terminal of the six connecting terminals, is arranged to offset to a back side of a second row (e.g., a second row R2 of the embodiment) composed of the fourth connecting terminal and the fifth connecting terminal, and the one-end part protrudes further inside the casing than the one-end parts of the connecting terminals of the second row.

With the above configuration, the fourth connecting terminal and the fifth connecting terminal held by the connector are arranged to offset in the axial direction with respect to the first connecting terminal, the second connecting terminal, and the third connecting terminal located in the first row. Further, the sixth connecting terminal held by the connector is arranged to offset in the axial direction with respect to the fourth connecting terminal and the fifth connecting terminal located in the second row. Therefore, since part of the six connecting terminals held by the connector are arranged to offset in the axial direction, the connector can be easily arranged in a dead space on an outer periphery of the one of the rotating electric machines.

The one-end part of the connecting terminal on a side facing an outer peripheral surface of the one of the rotating electric machines in the first row, the one-end part of the connecting terminal on the side facing the outer peripheral surface of the one of the rotating electric machines in the second row, and the one-end part of the sixth connecting terminal may be arranged along the outer peripheral surface of the one of the rotating electric machines.

In this case, since the connecting terminals of the respective rows of the connector are arranged along the outer peripheral surface of the one of the rotating electric machines, the connector can be arranged closer to the outer peripheral surface of the one of the rotating electric machines. Therefore, when this configuration is adopted, the connector can be arranged more compactly on the outer peripheral portion of the one of the rotating electric machines.

The one-end part of each of the connecting terminals may serve as an energization connecting part connected to a rotating electric machine side.

In this case, since the energization connecting part of each of the connecting terminals is arranged so as not to overlap with the connecting terminal on the front side when viewed from the axial direction, the connection operation between each of the connecting terminals and the rotating electric machine side can be easily performed from one side in the axial direction.

DESCRIPTION OF THE EMBODIMENTS

Figure 1:
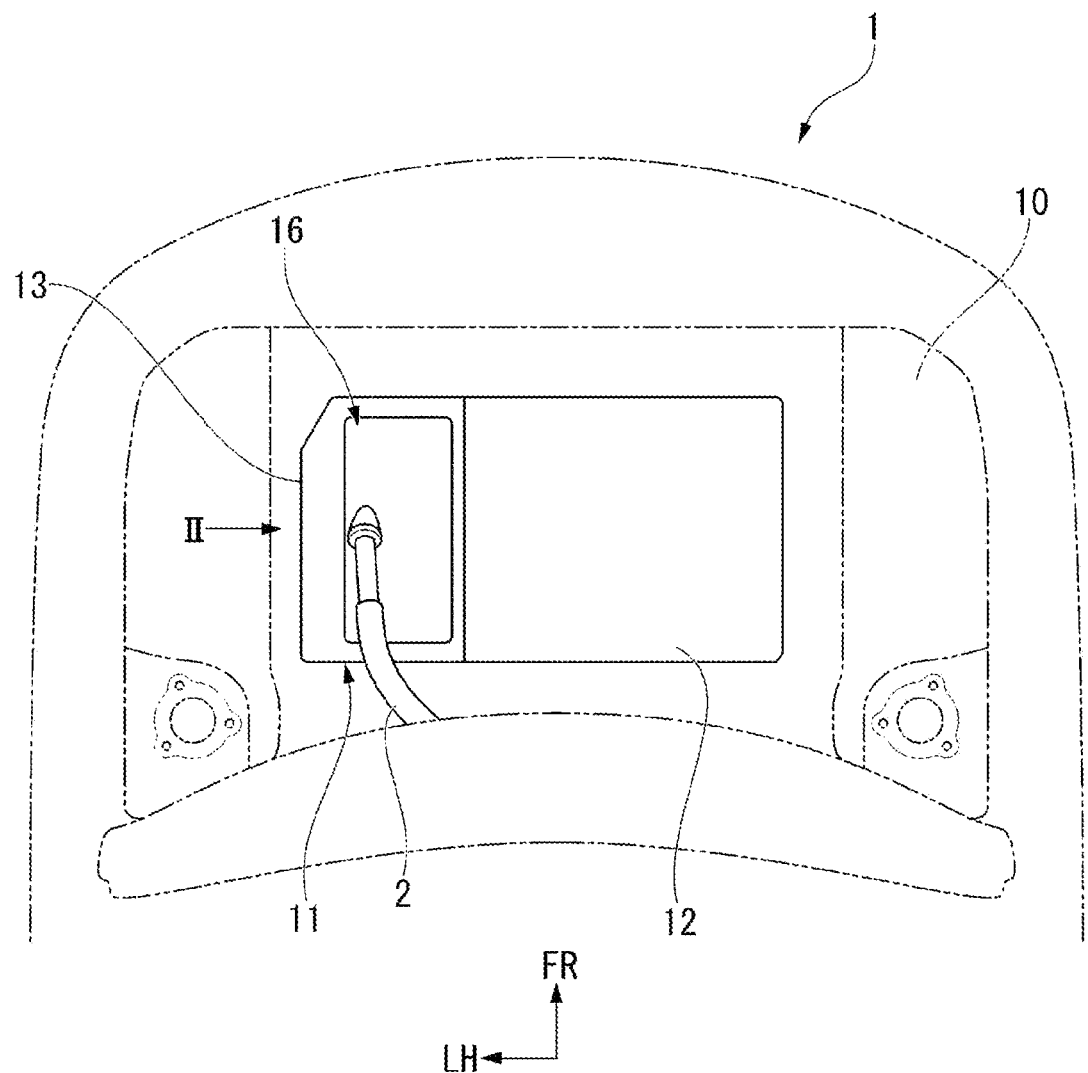
FIG. 1 is a plan view showing arrangements of components in an engine room of a vehicle of an embodiment.

The disclosure provides a rotating electric machine unit capable of miniaturizing an outer shape by enabling compactly arranging a connector holding six connecting terminals on an outer peripheral portion of one of the rotating electric machines.

In the disclosure, since part of the six connecting terminals held by the connector are arranged to offset in the axial direction of the one of the rotating electric machines, the connector can be easily arranged in a dead space on an outer periphery of the one of the rotating electric machines. Therefore, when the disclosure is adopted, the connector holding the six connecting terminals can be compactly arranged on the outer periphery of the one of the rotating electric machines, and the outer shape of the rotating electric machine unit can be miniaturized.

Hereinafter, embodiments of the disclosure will be described with reference to the drawings. In addition, an arrow FR pointing to a front side of a vehicle, an arrow UP pointing to an upper side of the vehicle, and an arrow LH pointing to a left side of the vehicle are labeled at appropriate positions in the drawings.

Figure 2:
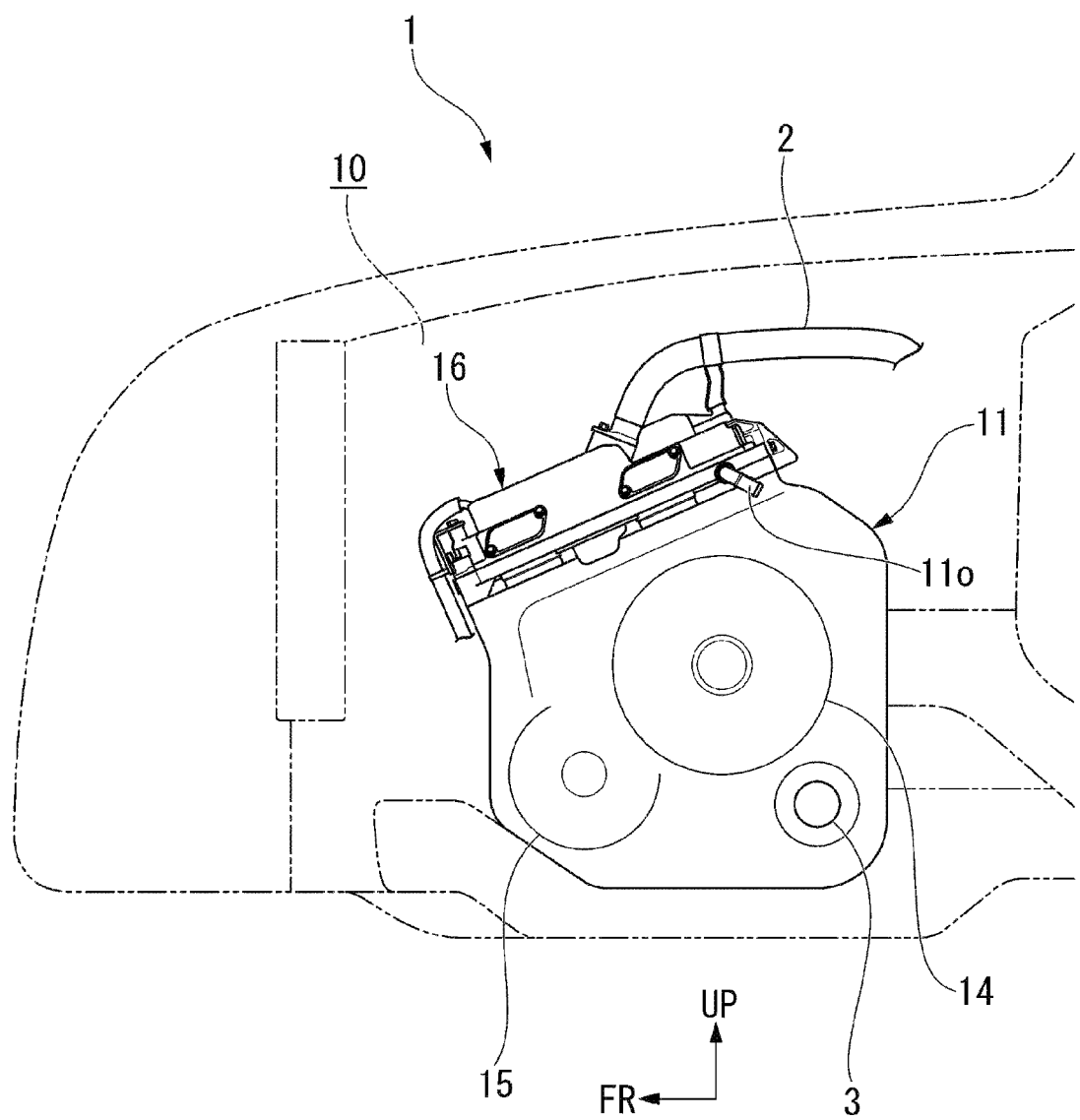
FIG. 2 is a schematic side view corresponding to an arrow II of FIG. 1 of the vehicle of the embodiment.

FIG. 1 is a plan view showing arrangements of components in an engine room 10 of a vehicle 1 of the embodiment, and FIG. 2 is a schematic side view corresponding to an arrow II of FIG. 1 of the vehicle 1.

The vehicle 1 of this embodiment is a hybrid vehicle including an engine 12 and a motor 14. A rotating electric machine unit 11 and the engine 12 are arranged in the engine room 10. The rotating electric machine unit 11 is integrally assembled to an end part of the engine 12 on an outer side in a vehicle width direction. In the rotating electric machine unit 11, the motor 14 and a generator 15 (i.e., two rotating electric machines) for driving the vehicle are housed inside a casing 13. A power drive unit (PDU) 16 is attached to an upper part of the casing 13 of the rotating electric machine unit 11. The power drive unit 16 boosts the DC power of a high-voltage battery (not shown; hereinafter referred to as a "battery") mounted on the vehicle 1 to a predetermined voltage and converts it into an AC power suitable for driving of the motor 14. Further, the power drive unit 16 converts the AC power regenerated by the motor 14 and the AC power generated by the generator 15 into a DC power, and lowers the voltage to a predetermined voltage to charge the battery.

Reference numeral 2 in FIG. 1 and FIG. 2 indicates a power supply cable that connects the power drive unit 16 and the battery (not shown), and reference numeral 3 indicates an output shaft that outputs the rotations of the motor 14 and the engine 12 to driving wheels (not shown).

Figure 3:
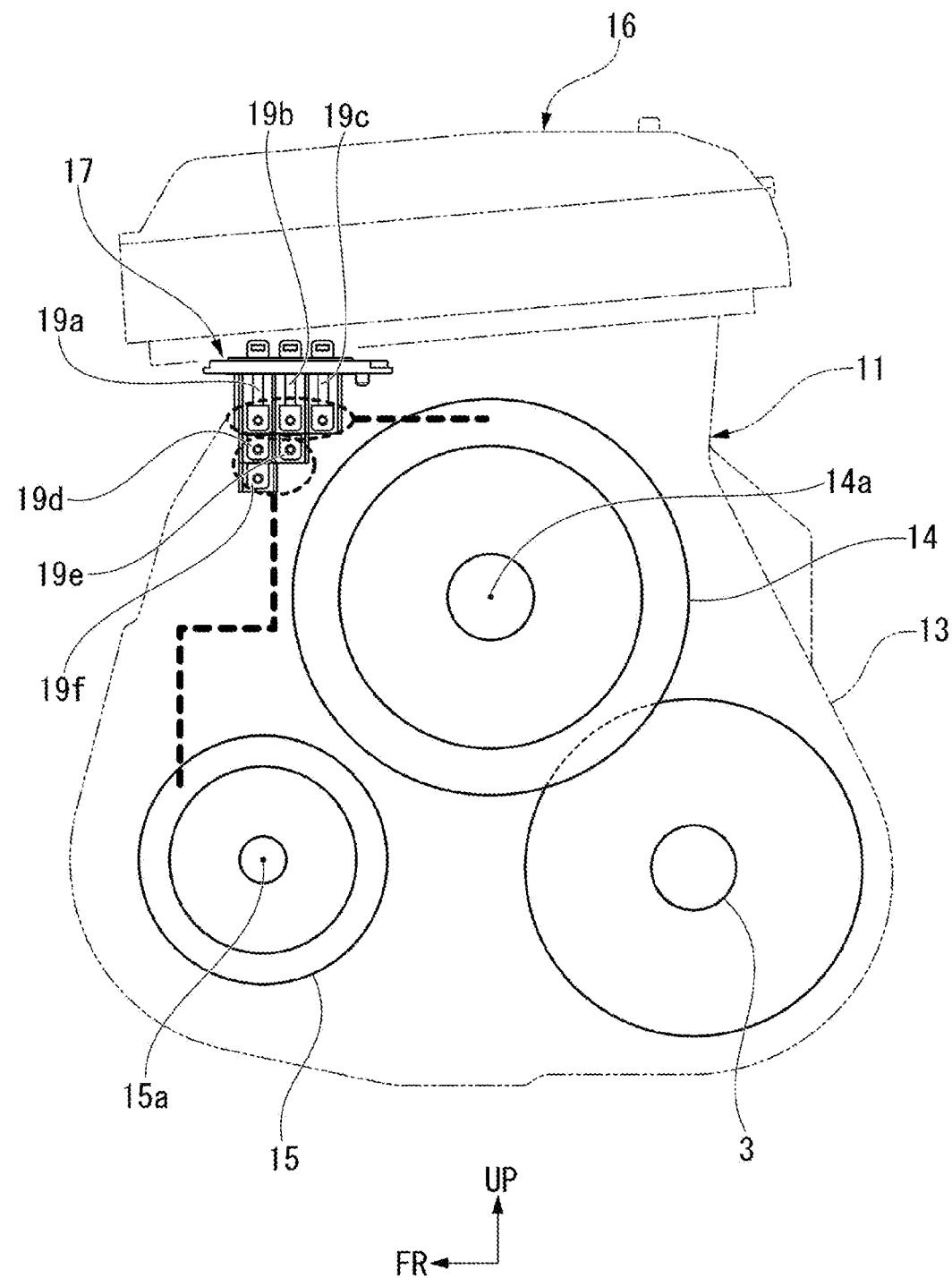
FIG. 3 is a side view showing an arrangement of a connector and two rotating electric machines of a rotating electric machine unit of the embodiment.
Figure 4:
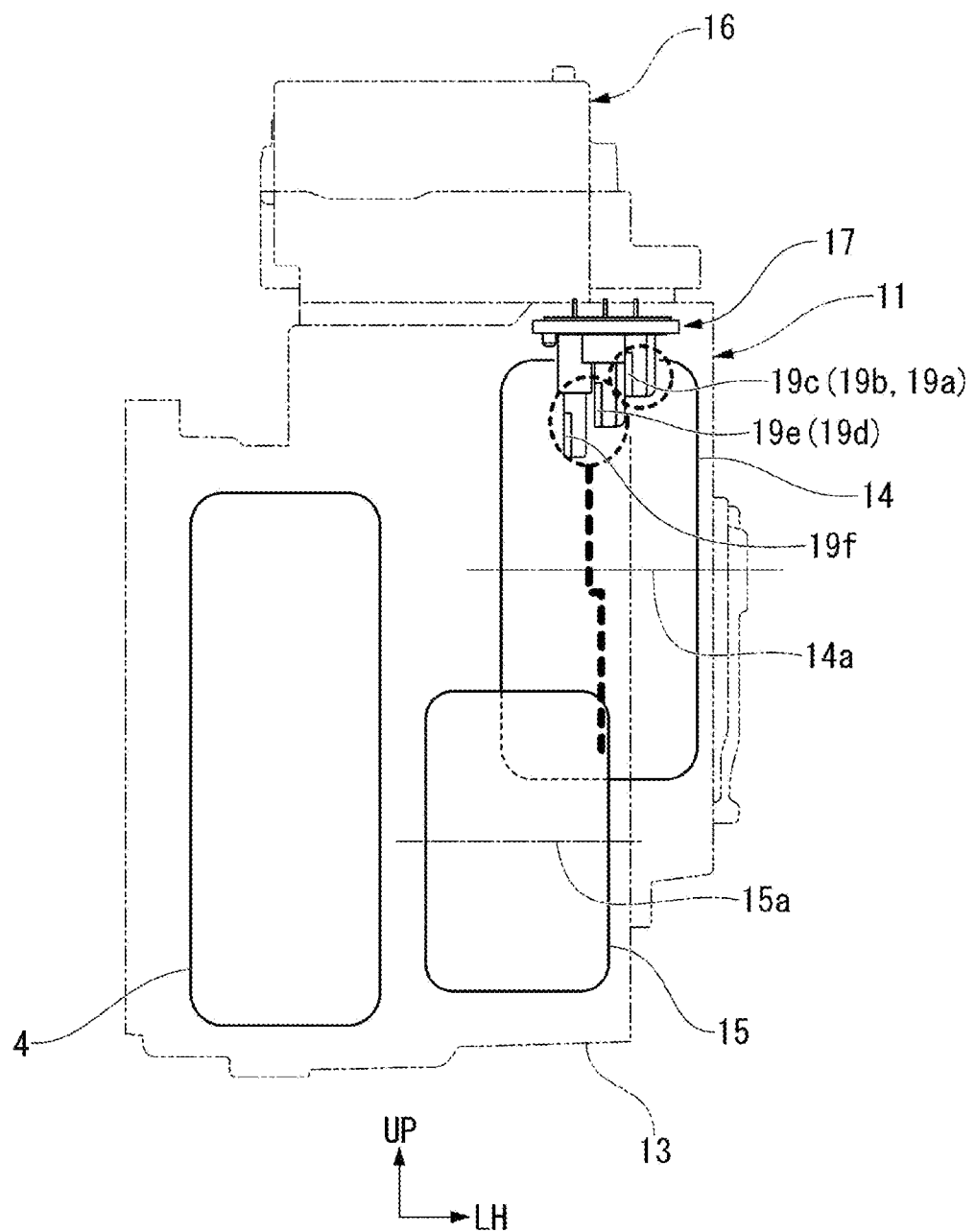
FIG. 4 is a front view showing an arrangement of the connector and the two rotating electric machines of the rotating electric machine unit of the embodiment.

FIG. 3 and FIG. 4 are a side view and a front view showing the arrangement of a connector 17 of the rotating electric machine unit 11, the motor 14, and the generator 15.

As shown in FIG. 3, the motor 14 for driving, which is a large component, is arranged substantially at the center, near the upper part in the casing 13 in the side view of the rotating electric machine unit 11. The generator 15 is arranged at a position below a front portion of the motor 14 in the casing 13, and the output shaft 3 is arranged at a position below a rear portion of the motor 14 in the casing 13.

Further, as shown in FIG. 4, the motor 14 is arranged at a position toward the outer side in the vehicle width direction of the casing 13, and the generator 15 is arranged to extend more inward in the vehicle width direction than the motor 14. Reference numeral 4 in FIG. 4 indicates a deceleration mechanism that decelerates the power of the engine 12 and transmits it to the generator 15. The deceleration mechanism 4 is arranged between the engine 12 and the generator 15.

The motor 14 and the generator 15 are arranged in the casing 13 in a manner that their rotation center axes 14a and 15a are oriented toward the vehicle width direction. Both the motor 14 and the generator 15 are formed in a short-axis columnar shape as a whole. The axial direction of the motor 14 (i.e., one of the rotating electric machines) refers to the direction toward which the rotation center axis 14a is oriented.

Figure 5:
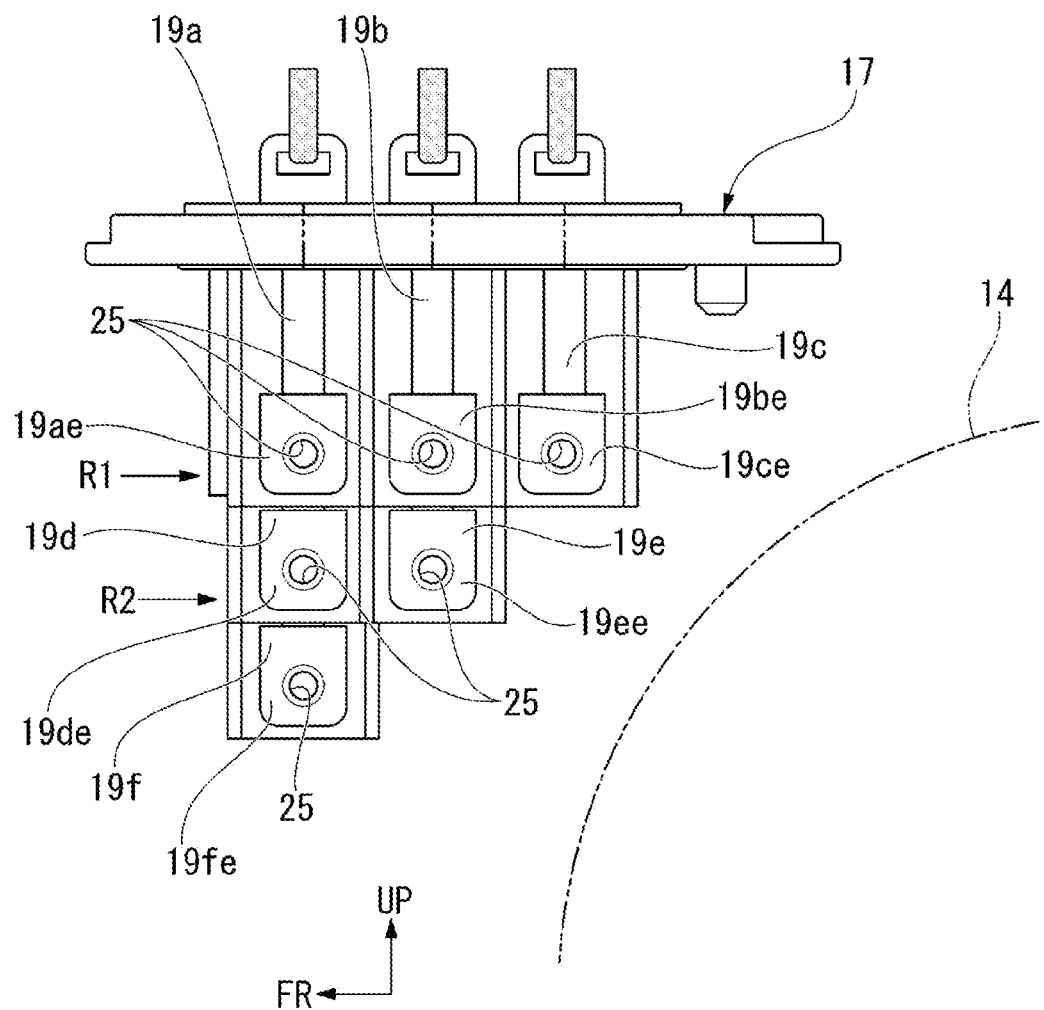
FIG. 5 is a front view of the connector of the embodiment.
Figure 6:
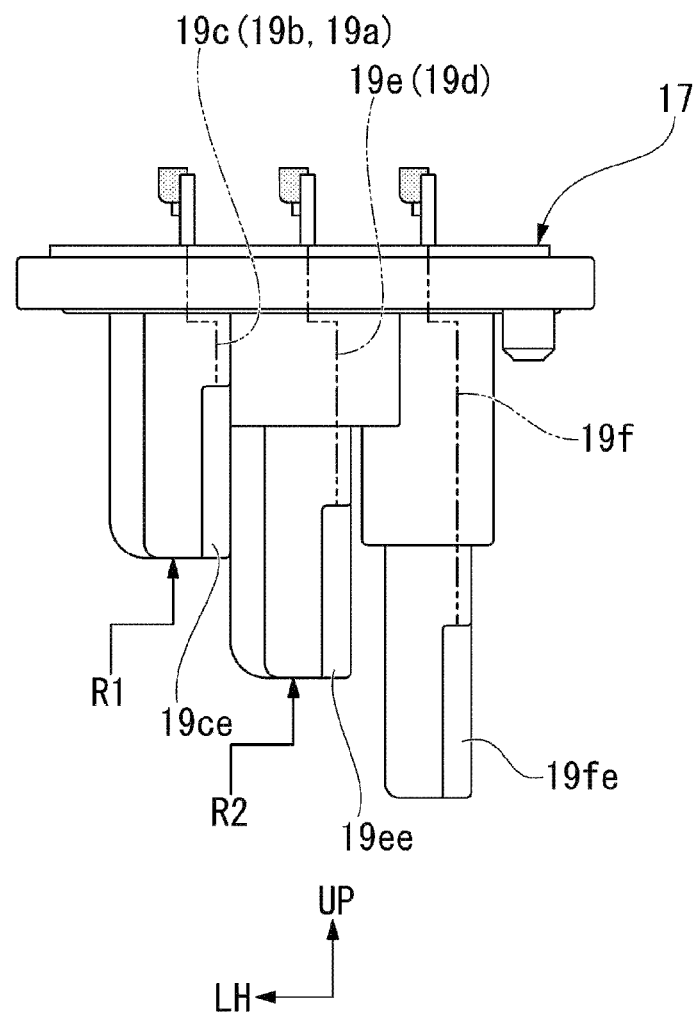
FIG. 6 is a side view of the connector of the embodiment.
Figure 7:
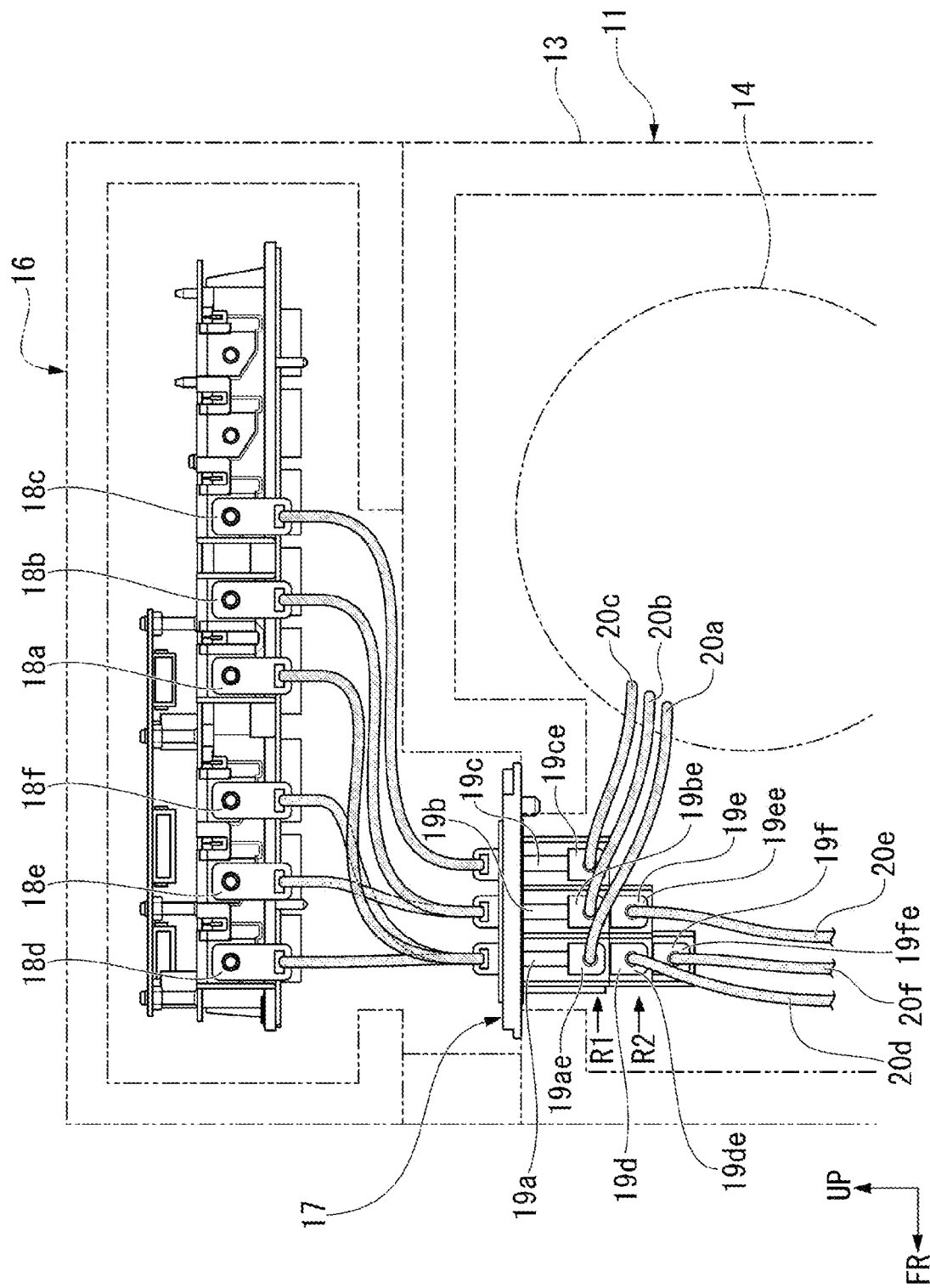
FIG. 7 is a side view showing a connection state between the connector of the embodiment and conductive passages inside a power drive unit.

FIG. 5 is a front view of the connector 17 (viewed from the outer side in the vehicle width direction), and FIG. 6 is a side view of the connector 17. Further, FIG. 7 is a side view showing a connection state between the connector 17 and conductive passages 18a to 18f inside the power drive unit 16.

As shown in FIG. 3 and FIG. 4, the connector 17 is attached to an upper surface near a front portion of the casing 13 of the rotating electric machine unit 11. The connector 17 holds three connecting terminals 19a, 19b, and 19c that connect energizing parts of three phases of the motor 14 in the rotating electric machine unit 11 to the corresponding conductive passages 18a, 18b, and 18c (see FIG. 7) in the power drive unit 16, and holds three other connecting terminals 19d, 19e, and 19f that connect energizing parts of three phases of the generator 15 in the rotating electric machine unit 11 to the corresponding conductive passages 18d, 18e, and 18f (see FIG. 7) in the power drive unit 16.

Hereinafter, the connecting terminals that connect the energizing parts of the three phases of the motor 14 to the conductive passage 18a, 18b, and 18c in the power drive unit 16 are referred to as a first connecting terminal 19a, a second connecting terminal 19b, and a third connecting terminal 19c. Further, the connecting terminals that connect the energizing parts of the three phases of the generator 15 to the conductive passages 18d, 18e, and 18f in the power drive unit 16 are referred to as a fourth connecting terminal 19d, a fifth connecting terminal 19e, and a sixth connecting terminal 19f.

The first to sixth connecting terminals 19a to 19f are all formed of a strip-shaped metal plate. The first to sixth connecting terminals 19a to 19f are held by the connector 17 so that a one-end part (lower end part) in a longitudinal direction is oriented toward a direction substantially orthogonal to the axial direction of the motor 14 (i.e., toward a substantially vertically downward direction).

As shown in FIG. 6, when viewed from the axial direction of the motor 14, one-end parts 19ae, 19be, and 19ce of the first connecting terminal 19a, the second connecting terminal 19b, and the third connecting terminal 19c are arranged side by side in a row. In this state, the one-end parts 19ae, 19be, and 19ce are aligned so that their plate thicknesses overlap with each other when viewed from the front-rear direction of the vehicle.

Further, when viewed from the axial direction of the motor 14, one-end parts 19de and 19ee of the fourth connecting terminal 19d and the fifth connecting terminal 19e are arranged to offset to a back side of a first row R1 composed of the first connecting terminal 19a, the second connecting terminal 19b, and the third connecting terminal 19c. In this embodiment, the fourth connecting terminal 19d is arranged on the back of the first connecting terminal 19a, and the fifth connecting terminal 19e is arranged on the back of the second connecting terminal 19b. The one-end part 19de of the fourth connecting terminal 19d and the one-end part 19ee of the fifth connecting terminal 19e are arranged side by side in a row. In this state, the one-end parts 19de and 19ee are aligned so that their plate thicknesses overlap with each other when viewed from the front-rear direction of the vehicle.

Further, a downward protrusion length of the one-end parts 19de and 19ee of the fourth connecting terminal 19d and the fifth connecting terminal 19e is longer than that of the connecting terminals of the first row R1. Therefore, the one-end parts 19de and 19ee of the fourth connecting terminal 19d and the fifth connecting terminal 19e protrude further inside the casing 13 than the one-end parts 19ae, 19be, and 19ce of the connecting terminals of the first row R1.

When viewed from the axial direction of the motor 14, a one-end part 19fe of the sixth connecting terminal 19f is arranged to offset to a back side of a second row R2 composed of the fourth connecting terminal 19d and the fifth connecting terminal 19e. In this embodiment, the sixth connecting terminal 19f is arranged on the back of the fourth connecting terminal 19d. A downward protrusion length of the one-end part 19fe of the sixth connecting terminal 19f is longer than that of the connecting terminals of the second row R2. Therefore, the one-end part 19fe of the sixth connecting terminal 19f protrudes further inside the casing 13 than the one-end parts 19de and 19ee of the connecting terminals of the second row R2.

As described above, part of the six connecting terminals held by the connector 17 are arranged to offset in the axial direction of the motor 14.

Further, a connection hole 25 is provided in each of the one-end parts 19ae to 19fe of the first to sixth connecting terminals 19a to 19f. Wiring cables 20a to 20f that connect the energizing parts of the motor 14 and the generator 15 with the one-end parts 19ae to 19fe are connected to the connection holes 25. Each of the one-end parts 19ae to 19fe of the first to sixth connecting terminals 19a to 19f serves as an energization connecting part connected to the motor 14 side or the generator 15 side.

As shown in FIG. 3 and FIG. 7, the first to sixth connecting terminals 19a to 19f held by the one connector 17 are arranged at an upper position on the front side of the motor 14, in the vicinity of a front upper corner portion of the casing 13. At this time, each of the one-end parts of the fourth connecting terminal 19d and the fifth connecting terminal 19e of the second row R2 protrudes below the first connecting terminal 19a, the second connecting terminal 19b, and the third connecting terminal 19c of the first row R1, but the sixth connecting terminal 19f is not arranged at a position adjacent to the motor 14 side of the fifth connecting terminal 19e. The sixth connecting terminal 19f is arranged on the back of the fourth connecting terminal 19d so that the one-end part 19fe protrudes below the second row R2. Therefore, the connector 17 can be arranged at a position sufficiently close to the motor 14 without causing a problem that the connecting terminals or the wiring cables 20a to 20f interfere with the motor 14.

Effect of Embodiment

As described above, in the rotating electric machine unit 11 of this embodiment, the fourth connecting terminal 19d and the fifth connecting terminal 19e held by the connector 17 are arranged to offset in the axial direction of the motor 14 with respect to the connecting terminals (19a, 19b, and 19c) of the first row R1. Then, the sixth connecting terminal 19f held by the connector 17 is arranged to offset in the axial direction with respect to the connecting terminals (19d and 19e) of the second row R2. Therefore, part of the six connecting terminals held by the connector 17 are arranged to offset in the axial direction of the motor 14. Accordingly, when the rotating electric machine unit 11 of this embodiment is adopted, the connector 17 holding the six connecting terminals can be arranged in a dead space on an outer periphery of the motor 14, and the outer shape of the rotating electric machine unit can be miniaturized.

In particular, when the connector 17 is arranged in the dead space on the upper front side of the motor 14, the arrangement position of the connector 17 can be lowered, and the height of the upper surface of the power drive unit 16 can be kept low.

Further, in the rotating electric machine unit 11 of this embodiment, among the six connecting terminals held by the connector 17, the one-end part 19ce of the third connecting terminal 19c of the first row R1, the one-end part 19ee of the fifth connecting terminal 19e of the second row R2, and the one-end part 19fe of the sixth connecting terminal 19f, which are arranged on a side facing the outer peripheral surface of the motor 14, are arranged stepwise along the outer peripheral surface of the motor 14. Therefore, the connector 17 can be arranged closer to the outer peripheral surface of the motor 14. Accordingly, when this configuration is adopted, the connector 17 can be arranged more compactly on the outer peripheral portion of the motor 14.

Further, in the rotating electric machine unit 11 of this embodiment, all of the one-end parts 19ae to 19fe of the six connecting terminals held by the connector 17 are arranged so as not to overlap with each other when viewed from the axial direction of the motor 14. The connection holes 25 are formed in the one-end parts 19ae to 19fe of the connecting terminals, and the wiring cables 20a to 20f on the motor 14 side and the generator 15 side are connected to the connection holes 25. Therefore, when this configuration is adopted, it is possible to easily connect the wiring cables 20a to 20f to the one-end parts 19ae to 19fe of the connecting terminals.

Another Embodiment

Figure 8:
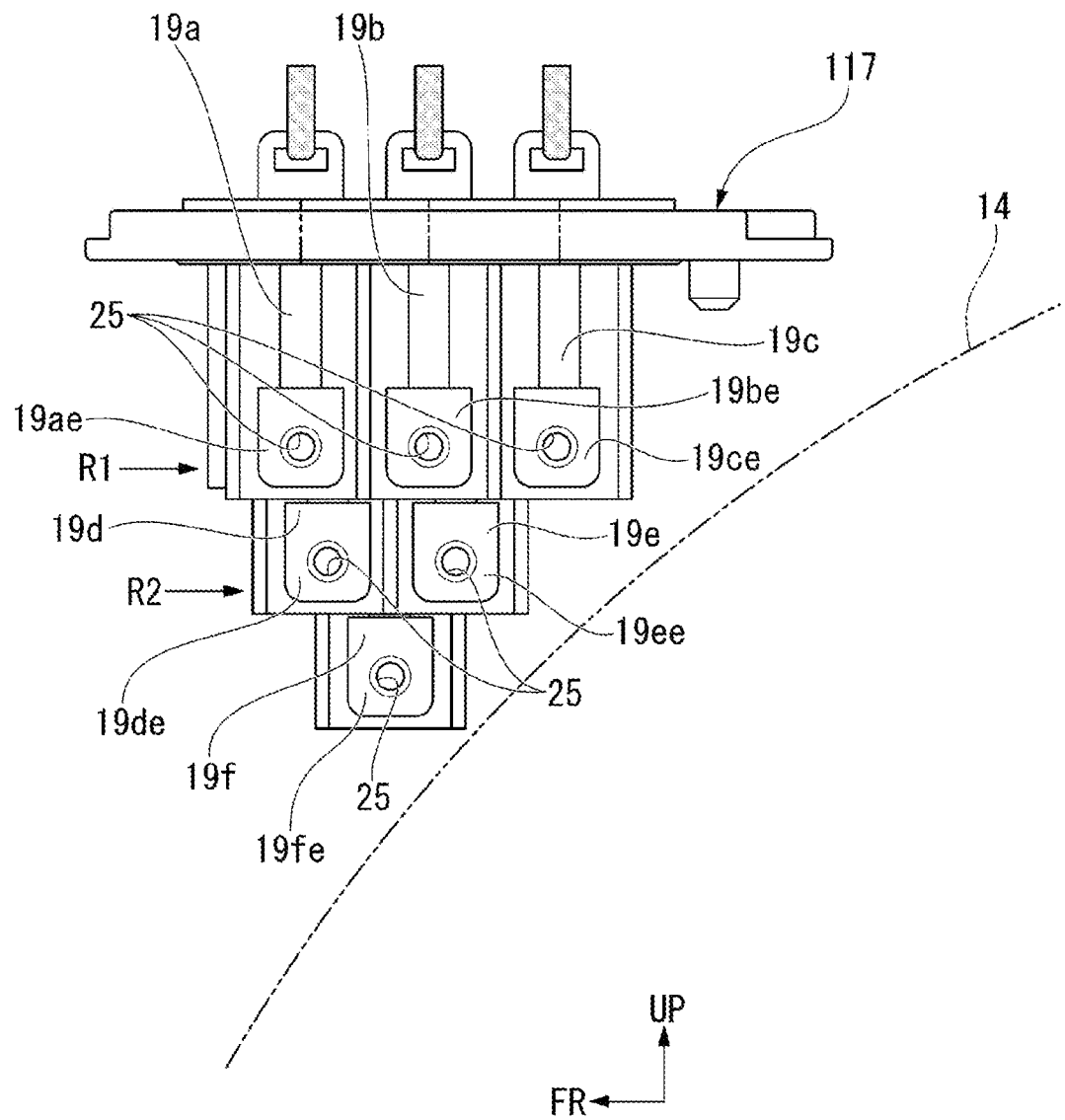
FIG. 8 is a front view of a connector of another embodiment.

FIG. 8 is a front view of a connector 117 of another embodiment.

In the connector 117 of this embodiment, the arrangement of the six connecting terminals supported by the connector 117 is slightly different from that of the above-described embodiment. Hereinafter, another embodiment will be described, but the same reference numerals will be labeled on the parts similar to the above embodiment and repeated descriptions will be omitted.

In the above embodiment, the fourth connecting terminal 19d is arranged on the back of the first connecting terminal 19a, the fifth connecting terminal 19e is arranged on the back of the second connecting terminal 19b, and the sixth connecting terminal 19f is arranged on the back of the fourth connecting terminal 19d. In contrast, in the connector 117 of this embodiment, the one-end part 19de of the fourth connecting terminal 19d is arranged on the back of a portion straddling the first connecting terminal 19a and the second connecting terminal 19b, the one-end part 19ee of the fifth connecting terminal 19e is arranged on the back of a portion straddling the second connecting terminal 19b and the third connecting terminal 19c, and the one-end part 19fe of the sixth connecting terminal 19f is arranged on the back of a portion straddling the fourth connecting terminal 19d and the fifth connecting terminal 19e.

In other words, in this embodiment, the one-end parts 19de and 19ee of the two connecting terminals of the second row R2 and the one-end part 19fe of the sixth connecting terminal 19f are arranged to shift by a predetermined amount in a direction approaching the outer peripheral surface of the motor 14.

Further, the connection hole 25 provided in the one-end part 19de of the fourth connecting terminal 19d is arranged at a position shifted in the front-rear direction with respect to the connection hole 25 of the first connecting terminal 19a and the connection hole 25 of the second connecting terminal 19b, and the connection hole 25 provided in the one-end part 19ee of the fifth connecting terminal 19e is arranged at a position shifted in the front-rear direction with respect to the connection hole 25 of the second connecting terminal 19b and the connection hole 25 of the third connecting terminal 19c. Further, the connection hole 25 provided in the one-end part 19fe of the sixth connecting terminal 19f is arranged at a position shifted in the front-rear direction with respect to the connection hole 25 of the fourth connecting terminal 19d and the connection hole 25 of the fifth connecting terminal 19e.

Effects of Another Embodiment

Since the basic configuration of the rotating electric machine unit of this embodiment is the same as that of the above embodiment, the same basic effects as those of the above embodiment can be obtained. However, in this embodiment, since the one-end parts 19de and 19ee of the fourth connecting terminal 19d and the fifth connecting terminal 19e, and the one-end part 19fe of the sixth connecting terminal 19f of the connector 117 are arranged to shift in the direction approaching the outer peripheral surface of the motor 14, the connector 117 can also be arranged closer to a portion of the outer peripheral surface of the motor 14 where the curve gradient is large. Further, since the one-end part of the connector 117 does not protrude significantly below the front portion of the connector 117, it is possible to prevent the lower front portion of the connector 117 from interfering with other components.

Further, in this embodiment, the positions of the connection holes 25 of the connecting terminals of the second row R2 are arranged to shift in the front-rear direction from the positions of the connection holes 25 of the connecting terminals of the first row R1, and the position of the connection hole 25 of the sixth connecting terminal 19f is arranged to shift in the front-rear direction from the positions of the connection holes 25 of the connecting terminals of the second row R2. Therefore, it is possible to prevent the wiring cables connected to the connection holes 25 of the connecting terminals from coming into strong contact with each other.

The disclosure is not limited to the above embodiments, and various design changes may be made without departing from the gist thereof.

What is claimed is:
1. A rotating electric machine unit comprising:
two rotating electric machines having energizing parts of three phases;
a casing that houses therein the two rotating electric machines;
three connecting terminals that connect the energizing parts of the three phases of one of the rotating electric machines to corresponding conductive passages of a power drive unit;
three other connecting terminals that connect the energizing parts of the three phases of the other of the rotating electric machines to corresponding conductive passages of the power drive unit; and
a connector that holds the six connecting terminals so that one-end parts in a longitudinal direction are oriented toward a same direction, wherein the connector is attached to the casing in a manner that the one-end parts of the six connecting terminals are oriented toward a direction substantially orthogonal to an axial direction of the one of the rotating electric machines,
wherein when viewed from the axial direction, the respective one-end parts of a first connecting terminal, a second connecting terminal, and a third connecting terminal, which are three connecting terminals of the six connecting terminals, are arranged side by side in a row,
when viewed from the axial direction, the respective one-end parts of a fourth connecting terminal and a fifth connecting terminal, which are two remaining connect- ing terminals of the six connecting terminals, are arranged to offset to a back side of a first row composed of the first connecting terminal, the second connecting terminal, and the third connecting terminal, and the one-end parts protrude further inside the casing than the one-end parts of the connecting terminals of the first row, and when viewed from the axial direction, the one-end part of a sixth connecting terminal, which is one remaining connecting terminal of the six connecting terminals, is arranged to offset to a back side of a second row composed of the fourth connecting terminal and the fifth connecting terminal, and the one-end part protrudes further inside the casing than the one-end parts of the connecting terminals of the second row.

2. The rotating electric machine unit according to claim 1, wherein the one-end part of the connecting terminal on a side facing an outer peripheral surface of the one of the rotating electric machines in the first row, the one-end part of the connecting terminal on the side facing the outer peripheral surface of the one of the rotating electric machines in the second row, and the one-end part of the sixth connecting terminal are arranged along the outer peripheral surface of the one of the rotating electric machines.

3. The rotating electric machine unit according to claim 2, wherein the one-end part of each of the connecting terminals serves as an energization connecting part connected to a rotating electric machine side.

* * * * *